United States Patent
Yuan (10) Patent No.: US 12,491,894 B2
(45) Date of Patent: Dec. 9, 2025

(54) METHOD AND SYSTEM FOR PROVIDING RECOMMENDATION SERVICE TO USER WITHIN VEHICLE

(71) Applicant: Bayerische Motoren Werke Aktiengesellschaft, Munich (DE)

(72) Inventor: Song Yuan, Beijing (CN)

(*) Notice: Subject to any disclaimer, the term of this patent is extended or adjusted under 35 U.S.C. 154(b) by 321 days.

(21) Appl. No.: 18/023,844

(22) PCT Filed: Jul. 27, 2021

(86) PCT No.: PCT/EP2021/070965
§ 371 (c)(1),
(2) Date: Feb. 28, 2023

(87) PCT Pub. No.: WO2022/048828
PCT Pub. Date: Mar. 10, 2022

(65) Prior Publication Data
US 2024/0025424 A1     Jan. 25, 2024

(30) Foreign Application Priority Data
Sep. 1, 2020    (CN) .......................... 202010901164.7

(51) Int. Cl.
*B60W 50/00*      (2006.01)
*B60W 40/09*      (2012.01)
(Continued)

(52) U.S. Cl.
CPC ........ *B60W 50/0098* (2013.01); *B60W 40/09* (2013.01); *B60W 50/14* (2013.01);
(Continued)

(58) Field of Classification Search
CPC .. B60W 50/0098; B60W 40/09; B60W 50/14; B60W 2050/143; B60W 2050/146;
(Continued)

(56) References Cited

U.S. PATENT DOCUMENTS

| | | | |
|---|---|---|---|
| 2019/0012599 A1* | 1/2019 | el Kaliouby ........... | G06N 3/084 |
| 2019/0073547 A1* | 3/2019 | el Kaliouby ........... | G06N 3/084 |

(Continued)

FOREIGN PATENT DOCUMENTS

WO     WO 2020/152678 A1     7/2020

OTHER PUBLICATIONS

International Search Report (PCT/ISA/210) issued in PCT Application No. PCT/EP2021/070695 dated Nov. 22, 2021 (three (3) pages).

(Continued)

*Primary Examiner* — Anne Marie Antonucci
*Assistant Examiner* — Jewel Ashley Kuntz
(74) *Attorney, Agent, or Firm* — Crowell & Moring LLP (57) ABSTRACT

A system and method that provide a recommendation service to a user within a vehicle are provided. According to the method, a current emotional state of the user in the vehicle is detected in real time by an emotional detection device of the system; a recommendation service that conforms to a behavior habit of the user is determined by a recommendation engine of the system based on the current emotional state of the user in conjunction with a profile of the user, wherein the profile of the user is generated by analyzing historical data of the user when using a third-party service; and the recommendation service is outputted on the vehicle by an output device of the system.

18 Claims, 7 Drawing Sheets

(51) Int. Cl.
  *B60W 50/14*    (2020.01)
  *G06N 3/04*     (2023.01)
(52) U.S. Cl.
  CPC ......... *G06N 3/04* (2013.01); *B60W 2050/143* (2013.01); *B60W 2050/146* (2013.01); *B60W 2540/22* (2013.01); *B60W 2556/10* (2020.02)
(58) Field of Classification Search
  CPC .......... B60W 2540/22; B60W 2556/10; G06N 3/04; G06N 3/045; G06N 3/08; G06Q 30/0255; G06F 16/9535; G06F 16/9537; G06F 16/958
  See application file for complete search history.

(56) References Cited

U.S. PATENT DOCUMENTS

| | | | |
|---|---|---|---|
| 2019/0354844 A1* | 11/2019 | Brasnett | G06F 17/16 |
| 2020/0242421 A1* | 7/2020 | Sobhany | B60W 50/08 |
| 2021/0218814 A1* | 7/2021 | Tran | G01S 13/86 |

OTHER PUBLICATIONS

Written Opinion (PCT/ISA/237) issued in PCT Application No. PCT/EP2021/070695 dated Nov. 22, 2021 (seven (7) pages).

* cited by examiner

METHOD AND SYSTEM FOR PROVIDING RECOMMENDATION SERVICE TO USER WITHIN VEHICLE

TECHNICAL FIELD

The present disclosure relates to a method for providing a recommendation service to a user within a vehicle, a computer-readable storage medium and a system for providing a recommendation service to a user within a vehicle.

BACKGROUND ART

At present, more and more Internet services push content and/or services to a user from time to time. In this way, the user might be disturbed by excessive information at any time regardless of his or her environment and emotion, thereby even irritating the user and stimulating him or her to take improper overdone behaviors. Once such circumstance occurs when the user drives a vehicle, it is possible to significantly affect the traffic safety. Therefore, how to provide an intelligent recommendation service in a vehicle has become an urgent technical problem to be solved.

However, since the time when the user is within the vehicle and the data, which may be detected within the vehicle and reflects a behavior habit, are relatively limited, it is difficult to accurately provide a satisfactory service to the user through traditional in-vehicle recommendation methods and systems.

CONTENT OF THE INVENTION

It is an object of the present disclosure to provide a method for providing a recommendation service to a user within a vehicle, a computer-readable storage medium and a system, so as to provide a recommendation service that meets the individual needs and real-time states of the user during the process of driving the vehicle.

According to a first aspect of the present disclosure, a method for providing a recommendation service to a user within a vehicle is provided. The method comprises the steps of:
  detecting a current emotional state of the user in the vehicle in real time;
  determining a recommendation service that conforms to a behavior habit of the user and is suitable for a current emotional state thereof based on the current emotional state of the user in conjunction with a profile of the user, wherein the profile of the user is generated by analyzing historical data of the user when using a third-party service; and
  outputting the recommendation service on the vehicle.

In the present disclosure, by means of said method, the recommendation service is generated based on an emotional state of the user detected in real time and taking into account a behavior habit of the user reflected by the use of a third-party service by the user beyond the vehicle. This means that, on the one hand, the recommendation service may not only take into account a momentary dynamic emotion of the user but also his or her static behavior habit as always; on the other hand, the recommendation service is not only based on a behavior performance of the user in the vehicle but also a habit and preference of the user reflected in an environment beyond the vehicle. Therefore, in the present disclosure, it is possible to accurately provide the user in the vehicle with the recommendation service that conforms the behavior habit of the user and is suitable for the current emotional state thereof. Such recommendation service can effectively ensure the traffic safety when the user drives the vehicle and can be adapted to the individual needs of the user. At the same time, since the user profile and/or data generated by data derived from the third-party service are/is used in generating the recommendation service, it is also possible to expand the type and the content of the recommendation service, thereby serving the user more widely in the vehicle.

Here, the third-party service may include calendar information, schedule information, a telephone list, a pending matter list, a portal website, a social network website, an online office website, a news website, a shopping website, a discount website, a takeaway service website, an appointment service website, an electronic payment website, an electronic reading website, a music website, an audio book website, a transportation website, a movie theater website, a ticket booking website, a travel website, a flight website, a restaurant website, a hotel website, a review website or a weather website. The third-party service may be used typically with a personal computer, a smart phone, a tablet computer, a smart bracelet, a smart speaker, smart glasses, and the like.

Here, the emotions may include: ease, excitement, delight, frustration, depression, sadness, irritability, impatience, anxiety, tension, calm, fear, fatigue, and the like.

For example, in the present disclosure, if it is detected in real time that the user is in an emotion of ease, it is possible to recommend movie information or show time information particularly of the nearby movie theaters to the user in combination with the historical data that the user often books a movie ticket using a ticket booking website or a movie theater website in the same emotion. If it is detected in real time that the user is in an emotion of excitement, it is possible to recommend alcohol products to the user in combination with the historical data that the user often purchases alcohol products using a shopping website in the same emotion. If it is detected in real time that the user is in an emotion of frustration, it is possible to automatically replay a particular song or song list in the vehicle in combination with the historical data that the user often replays a particular song or song list using a music website in the same emotion. If it is detected in real time that the user is in a mood of irritability, it is possible to plan a route or provide a location-based service (LBS) that is preferably related to a current location in the vehicle in combination with the historical data that the user frequently uses electronic payment in a store or a restaurant in the same emotion. Accordingly, it may be seen that in the present disclosure, it is possible to accurately provide a user in the vehicle with a recommendation service that conforms a behavior habit of the user and is suitable for a current emotional state thereof.

According to one embodiment of the present disclosure, the recommendation service is determined by a recommendation model based on a neural network, wherein the recommendation model is trained based on product/service information, geographical information and emotional information, which are obtained from the historical data. In order to accurately predict the recommendation service, a neural network is advantageously applied so as to realize self-learning of the model and efficient processing of mass data. Here, the neural network may include a convolutional neural network (CNN), a deep neural network (DNN), a recurrent neural network (RNN), an LSTM neural network, a graph neural network, and the like. Here, the recommendation model is trained by product/service information, geographic information, and emotional information, which are obtained from the historical data when user uses a third-party service, so as to ensure that the output data of the recommendation model considers an emotion of the user whilst estimating the relevance of the product/service.

According to one embodiment of the present disclosure, the geographic information is relative geographic information determined based on geographic information of the user and geographic information of a product/service; and/or the emotional information is determined based on a user interaction record. Here, since the vehicle brings mobility to the user as a transport tool, it is more meaningful to input relative geographic information in the training of the recommendation model. In this way, it is also possible to better support the recommendation service, particularly a recommendation service like location-based service (LBS). Here, the relative geographic information may be the relative distance between geographic information of the user and geographic information of the product/service. Preferably, the relative distance may be ranked. In addition, emotional information is provided based on a user interaction record, particularly an operation of the user in the interface. After studies, it has been found that, for example, in an emotion of ease or delight, the user is more likely to input or skip different subjects frequently; in an emotion of impatience, the user is more likely to quickly slide up and down, return and restore and the like on a page; in an emotion of frustration, the user is more likely to perform an operation more slowly with a longer stay on a page. Thus, based on such user interaction record, it is possible to determine an emotion of the user at the moment of using a third-party service.

According to one embodiment of the present disclosure, the recommendation model is modified based on a data set derived from the vehicle and/or the profile of the user by means of layer transfer technology. In order to allow that the recommendation model is more suitable for use in the vehicle, by means of the layer transfer technology, the operation habit of the user on the vehicle and/or the profile of the user representative of the characteristics of the user are further incorporated into the recommendation model. In addition, it is also possible to efficiently use possible neural network models, save the model training cost and time, and avoid a prediction error caused by limited data set samples of the vehicle.

According to one embodiment of the present disclosure, parameters of some layers in a primitive neural network are retained in the layer transfer, and re-trained based on the data set derived from the vehicle, wherein the data set derived from the vehicle at least includes behavior data and feedback data of the user on the vehicle; and/or a loss function is established using the profile of the user, so as to reversely configure the parameters in the primitive neural network.

According to one embodiment of the present disclosure, the current emotional state of the user in the vehicle is detected in real time based on current vehicle state data, user state data, and user interaction data according to an emotional discriminating model. In order to accurately discriminate the emotion of the user in the vehicle, in the present disclosure, an emotional discriminating model is also preferably applied such that it is possible to quantify an emotion of the user in the vehicle and/or the back end by a such trained emotional discriminating model. Alternatively, it is possible to output a current emotional state of the user based on the input of current vehicle state data, user state data and user interaction data.

According to one embodiment of the present disclosure, the emotional discriminating model is trained based on vehicle state data, user state data and user interaction data available, as well as their artificially identified emotional classification. Advantageously, the emotional discriminating model may also be a neural network model, such as a convolutional neural network (CNN), a deep neural network (DNN), a recurrent neural network (RNN), an LSTM neural network, a graph neural network, and the like.

According to one embodiment of the present disclosure, the vehicle state data includes: radar ranging data, speed data, acceleration data, gyroscope data, gear position data, geographic information data, engine rotation speed data, throttle depth and/or speed data, braking depth and/or speed data, steering wheel angular speed data, air conditioner data, and window state data; and/or the user state data includes: an in-vehicle camera data, electromagnetic wave reflection data, steering wheel and/or dashboard pressure sensitive data, pulse data, respiration data, body temperature data, and blood pressure data; and/or the user interaction data includes: user touch input data, speech data, and gesture data. Here, the electromagnetic wave reflection data may be WiFi reflection data or Bluetooth reflection data reflected on a body surface of a person, so that an emotion of the user may be well recognized by analyzing this data. Regarding this, it is possible to refer to "Emotion Recognition using Wireless Signals," M. Zhao, F. Adib and D. Katabi, ACM International Conference on Mobile Computing and Networking (MobiCom), 2016.

According to one embodiment of the present disclosure, the recommendation service includes at least one of entertainment recommendations, soothing recommendations, and safety recommendations. Here, the entertainment recommendations include: route planning, provision of location-based service, schedule planning and/or display of recommended content and the like; the soothing recommendations include: route planning, provision of location-based service, audio playback, video playback, ambient light setting, seat adjustment, window and/or seat adjustment and the like; the safety recommendations include: speech prompt, vehicle speed limit, throttle limit, whistle limit, and/or speaker volume limit and the like. Here, for example, the entertainment recommendations may be provided when the user is in an emotion of ease, excitement or delight; the soothing recommendations may be provided when the user is in an emotion of frustration, depression, sadness, irritability, impatience, anxiety, tension, calm, and fatigue; and the safety recommendations may be provided when the user is in an emotion of irritability, impatience, tension and fatigue. Here, it should be noted that, in the present disclosure, it is possible to not only generate more than one recommendation service simultaneously, but also output the more than one recommendation service simultaneously or sequentially in time. As an example, when the user is impatient, it is possible to consider outputting safety recommendations first, which may include speech prompting that the current emotion of the user might render a safety risk and limiting a speed of the vehicle. Next, it is also possible to output soothing recommendations, for example to provide information about an entertainment place such as a cafe ahead based on the current position, so that the user may soothe the current emotion of impatience timely.

According to one embodiment of the present disclosure, the recommendation service is output through a speaker, a display, an air conditioner, a power unit, an ambient light, a vehicle window, and/or a seat adjustment device and the like. Here, for example, a speech prompt and a recommended audio may be replayed by a speaker; recommended route planning and recommended content (for example recommended product information or recommended service information such as promotional information and movie show time information, and recommended videos) may be displayed by a display; a temperature within the vehicle is reduced by an air conditioner or ventilation is performed by opening a window, so that the user may soothe an emotion of irritability or tension so as to calm down; an in-vehicle atmosphere feeling may be adjusted by an ambient light; and the user may be adjusted to a more comfortable posture by a seat adjustment device.

According to a second aspect of the present disclosure, a non-transitory computer readable storage medium having executable instructions is provided, which, when executed, prompt a computer to perform the method according to the present disclosure.

According to a third aspect of the present disclosure, a system for providing a recommendation service to a user within a vehicle is provided. The system comprises:
- an emotional detection device configured to detect a current emotional state of the user in the vehicle in real time;
- a recommendation engine configured to determine a recommendation service that conforms to a behavior habit of the user and is suitable for a current emotional state thereof based on the current emotional state of the user in conjunction with a profile of the user, wherein the profile of the user is generated by analyzing historical data of the user when using a third-party service; and
- an output device configured to output the recommendation service on the vehicle.

In the present disclosure, by means of the system, the recommendation engine generates a recommendation service based on an emotional state of the user detected in real time and taking into account a behavior habit of the user reflected by the use of a third-party service by the user beyond the vehicle. This means that, on the one hand, the recommendation engine may not only take into account a momentary dynamic emotion of the user but also his or her static behavior habit as always; on the other hand, the recommendation engine is not only based on a behavior performance of the user in the vehicle but also a preference of the user reflected in an environment beyond the vehicle. Therefore, in the present disclosure, it is possible to accurately provide a user in the vehicle with the recommendation service that conforms to the behavior habit of the user and is suitable for the current emotional state thereof. Such recommendation service can effectively ensure the traffic safety when the user drives the vehicle and can be adapted to the individual needs of the user. At the same time, since the user profile and/or data generated by data derived from the third-party service are/is used in generating the recommendation service by the recommendation engine, it is also possible to expand the type and the content of the recommendation service, thereby serving the user more widely in the vehicle.

According to one embodiment of the present disclosure, the recommendation engine is constructed with a recommendation model based on a neural network, wherein the recommendation model is trained based on product/service information, geographical information and emotional information obtained from the historical data.

According to one embodiment of the present disclosure, the emotional detection device includes a vehicle state sensor, a user state sensor, a user input device, and an emotion discriminator constructed with an emotional discriminating model. Preferably, the emotion discriminator is arranged in the vehicle to process data from the vehicle state sensor, the user state sensor and the user input device in real time, and obtain a current emotional state of the user timely.

According to one embodiment of the present disclosure, the emotional discriminating model is trained in an emotional analyzing device in a back end based on vehicle state data, user state data and user interaction data available, as well as their artificially identified emotional classification. Here, the emotional analyzing device is arranged in the back end. As a result, the emotional discriminating model is advantageously trained by a more powerful computing capability of the back-end, and the parameters of the trained emotional discriminating model may be sent to the emotion discriminator arranged in the vehicle so as to improve the real-time detection of an emotion.

According to one embodiment of the present disclosure, the vehicle state sensor includes: a radar, a speedometer, an accelerometer, a gyroscope, a gear position sensor, a positioning sensor, an engine rotation speed sensor, a throttle sensor, a brake sensor, a steering wheel sensor, an air conditioner sensor, and a window state sensor and the like; the user state sensor includes: an in-vehicle camera, an electromagnetic wave signal receiver, and a pressure sensor provided in a steering wheel and/or a dashboard and the like, a pulse sensor, a respiration sensor, a body temperature sensor, and a blood pressure sensor; and the user input device includes: a button, a touch screen, a microphone, and an in-vehicle camera and the like.

According to one embodiment of the present disclosure, the output device includes: a speaker, a display, an air conditioner, a power unit, an ambient light, and a seat adjustment device and the like.

According to one embodiment of the present disclosure, the recommendation engine is arranged in a back end and integrated with an interface docked with a third-party service.

It should be noted that, the features, elements, functions, effects and advantages according to one aspect of the present disclosure may also refer to the above-described descriptions according to other aspects of the present disclosure. In addition, various aspects described in this document may be diversified and combined with each other.

DETAILED DESCRIPTION OF THE DRAWINGS

Figure 1:
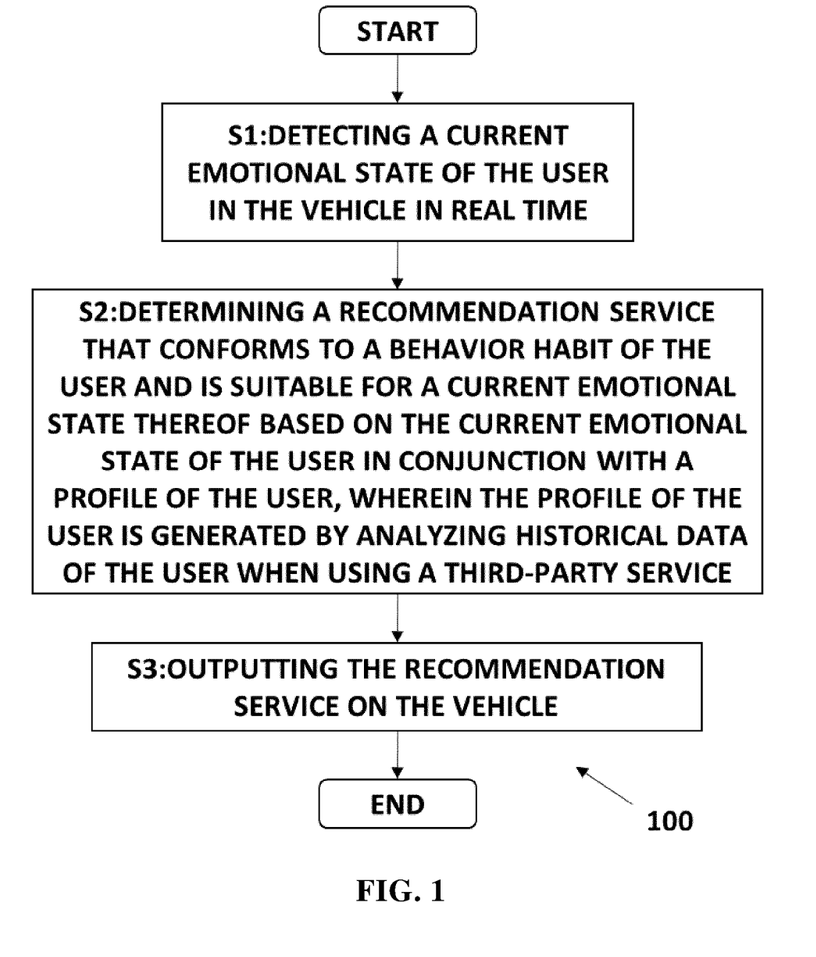
FIG. 1 shows a flowchart of a method for providing a recommendation service to a user within a vehicle according to the present disclosure.

FIG. 1 shows a flowchart of a method 100 for providing a recommendation service to a user within a vehicle according to the present disclosure. The method 100 comprises the steps of:
  Step S1: detecting a current emotional state of the user in the vehicle in real time;
  Step S2: determining a recommendation service that conforms to a behavior habit of the user and is suitable for a current emotional state thereof based on the current emotional state of the user in conjunction with a profile of the user, wherein the profile of the user is generated by analyzing historical data of the user when using a third-party service; and
  Step S3: outputting the recommendation service on the vehicle.

According to one preferred embodiment, the recommendation service is determined by a recommendation model based on a neural network, wherein the recommendation model is trained based on product/service information, geographical information and emotional information obtained from the historical data. Preferably, the geographic information is relative geographic information determined based on geographic information of the user and geographic information of a product/service; and/or the emotional information is determined based on a user interaction record. Here, the neural network may include a convolutional neural network (CNN), a deep neural network (DNN), a recurrent neural network (RNN), an LSTM neural network, a graph neural network, and the like.

Figure 2:
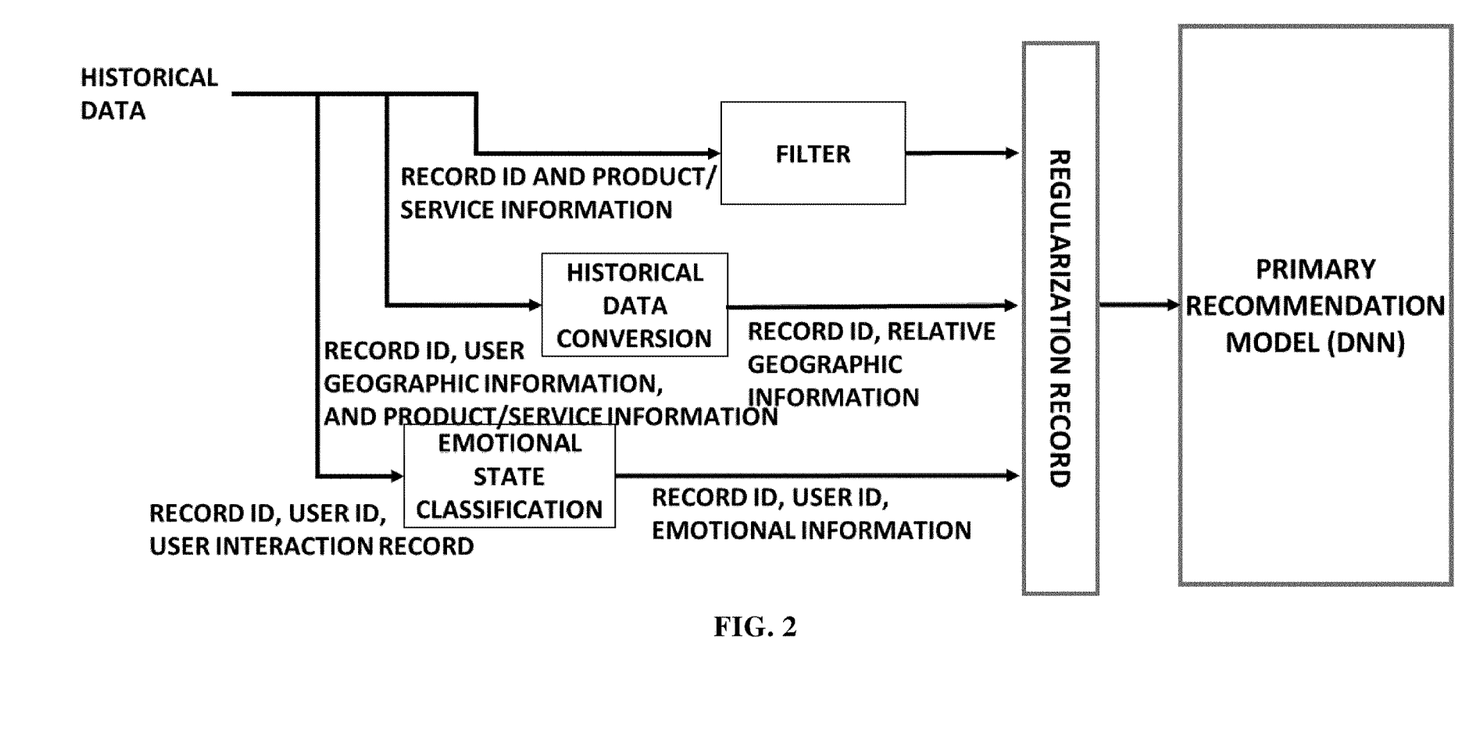
FIG. 2 shows an exemplary training method of a recommendation model based on a neural network according to the present disclosure.

FIG. 2 shows an exemplary training method of a recommendation model based on a neural network according to the present disclosure. Here, in order to be distinguishable from the following, the recommendation model shown in FIG. 2 is named a primary recommendation model. Without loss of generality, the primary recommendation model is constituted as a recommendation model according to the present disclosure.

As an example, the primary recommendation model here may be a deep neural network (DNN). During the process of training the recommendation model, at least product/service information, geographic information, and emotional information obtained from the historical data when user uses a third-party service are used as a training data set. As shown in FIG. 2, the record ID and product/service information of the historical data may be filtered. In addition, the historical data when the user use a third-party service also typically include user geographic information and product/service geographic information. Here, in order to better support a recommendation service in the vehicle, particularly a location-based service (LBS), relative geographic information such as a relative distance between user geographic information and product/service geographic information or rank of the relative distance is used in the training of the recommendation model. For example, the relative distance is simply depicted to be 1 (within 2 kilometers), 2 (within 5 kilometers), 3 (within 10 kilometers), and 4 (beyond 10 kilometers). In addition, in the training of the recommendation model according to the present disclosure, it is not only necessary to estimate the relevance of the product/service like in traditional recommendation models, but also necessary to incorporate the current emotional information of the user into the recommendation model. To this end, it is possible to classify an emotional state of a user interaction record, particularly a user behavior record, so as to infer the emotional information of the user. Advantageously, the record ID, user ID, product/service information, relative geographic information and emotional information in the above-described data processing are also subjected to regularization processing, so that these training data are fed to the recommendation model training machine at a uniform scale.

Figure 3:
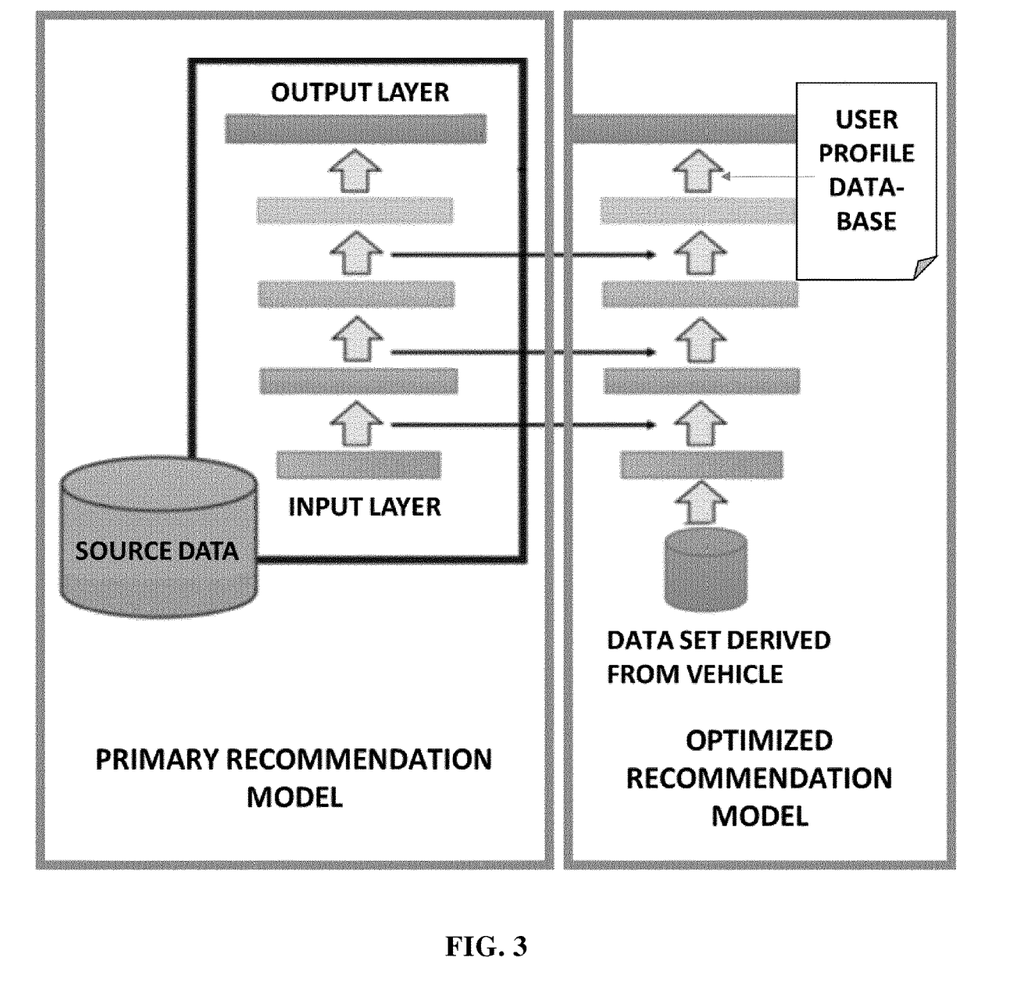
FIG. 3 shows an exemplary correction method of the recommendation model according to the present disclosure through transfer learning.

According to one preferred embodiment of the present disclosure, the recommendation model is modified based on a data set derived from the vehicle and/or the profile of the user by means of layer transfer technology. Preferably, parameters of some layers in a primitive neural network are retained in the layer transfer, and re-trained based on the data set derived from the vehicle, wherein the data set derived from the vehicle at least includes behavior data and feedback data of the user on the vehicle, and may also particularly include vehicle state data, user state data and user interaction data; and/or a loss function is established using the profile of the user, so as to reversely configure the parameters in the primitive neural network.

FIG. 3 shows an exemplary correction method of the recommendation model according to the present disclosure through transfer learning. In the aforementioned primary recommendation model, although factors such as an emotion and a behavior habit have been taken into consideration, the primary recommendation model may also be further optimized to allow that the recommendation model is more suitable for use in the vehicle. Here, the optimization and correction of the recommendation model is realized by means of transfer learning or layer transfer. As shown in FIG. 3, the layer transfer technology (Layer Transfer), as shown by the arrows, the parameters from the 0th layer to the penultimate layer of the primary recommendation system are exemplarily transferred into the optimization recommendation system. Re-training is performed based on the data set derived from the vehicle, wherein the data set derived from the vehicle at least includes behavior data and feedback data of the user on the vehicle, and may particularly include emotion data of the user present on the vehicle. However, it is not limited to this, and may also include vehicle state data, user state data and user interaction data. In this way, it is possible to retain the prediction of a behavior pattern and preference of the user in different emotions on the recommendation model. As an example, a loss function is established in a final layer using the profile of the user, so as to reversely configure the parameters in the primitive neural network. In this way, the operation habit of the user on the vehicle and/or a profile of the user representative of the characteristics of the user are further incorporated into the recommendation model. The optimization recommendation model thus corrected not only contains information about an ordinary operation habit of the user, but also includes information specific to the vehicle.

Figure 4:
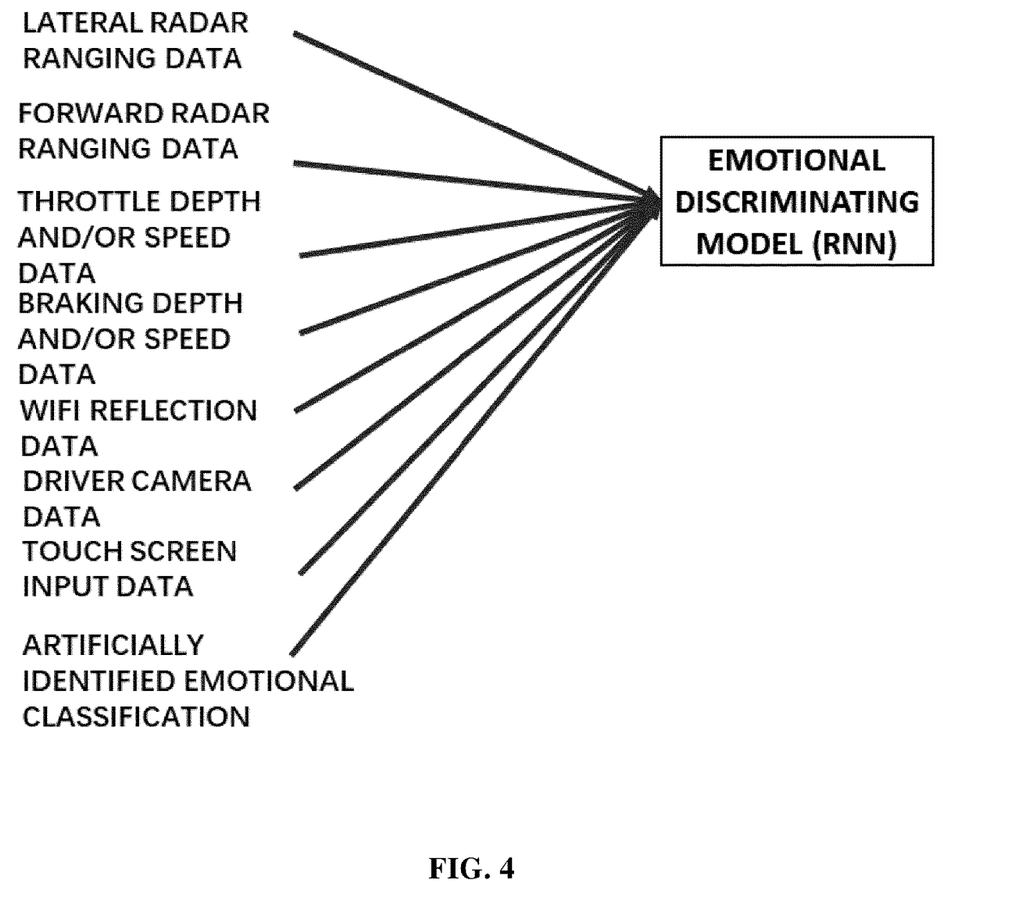
FIG. 4 shows an exemplary training method of the emotional discriminating model based on a neural network according to the present disclosure.

According to one preferred embodiment, the current emotional state of the user in the vehicle is detected in real time based on current vehicle state data, user state data, and user interaction data according to an emotional discriminating model. Advantageously, the emotional discriminating model is trained based on vehicle state data, user state data and user interaction data available, as well as their artificially identified emotional classification. Advantageously, the emotional discriminating model may also be a neural network model, such as a convolutional neural network (CNN), a deep neural network (DNN), a recurrent neural network (RNN), an LSTM neural network, a graph neural network, and the like. Here, the vehicle state data may include: radar ranging data, speed data, acceleration data, gyroscope data, gear position data, geographic information data, engine rotation speed data, throttle depth and/or speed data, braking depth and/or speed data, steering wheel angular speed data, air conditioner data, and window state data; and/or the user state data may include: an in-vehicle camera data, electromagnetic wave reflection data, steering wheel and/or dashboard pressure sensitive data, pulse data, respiration data, body temperature data, and blood pressure data; and/or the user interaction data may include: user touch input data, speech data, and gesture data.

FIG. 4 shows an exemplary training method of the emotional discriminating model based on a neural network according to the present disclosure. Here, the emotional discriminating model may be based on a recurrent neural network (RNN). The trained emotional discriminating model is capable of detecting the current emotional state of the user in the vehicle in real time based on current vehicle state data, user state data, and user interaction data. Here, the training data for use in training the emotional discriminating model is exemplarily listed as follows: vehicle state data, such as lateral radar ranging data, forward radar ranging data, throttle depth and/or speed data, braking depth and/or speed data; user state data, such as WiFi reflection data and driver camera data; user interaction data, such as touch screen input data; and an emotional classification artificially identified for these data described above. Here, the user operation intensity and stress time of the user may be reflected by the accelerator depth and/or speed data, braking depth and/or speed data, and the user operation intensity and stress time of the user may in turn map an emotion of the driver. In addition, the forward and lateral radar ranging data objectively reflect the reaction time of the driver and the travel environment of the vehicle, so as to achieve a comprehensive evaluation of an emotion of the driver. It is possible to quantify an emotion of the user in the vehicle and/or the back end by the emotional discriminating model thus trained. That is, a current emotional state of the user in the vehicle is detected in real time based on relevant data that can be obtained on the vehicle.

Figure 5:
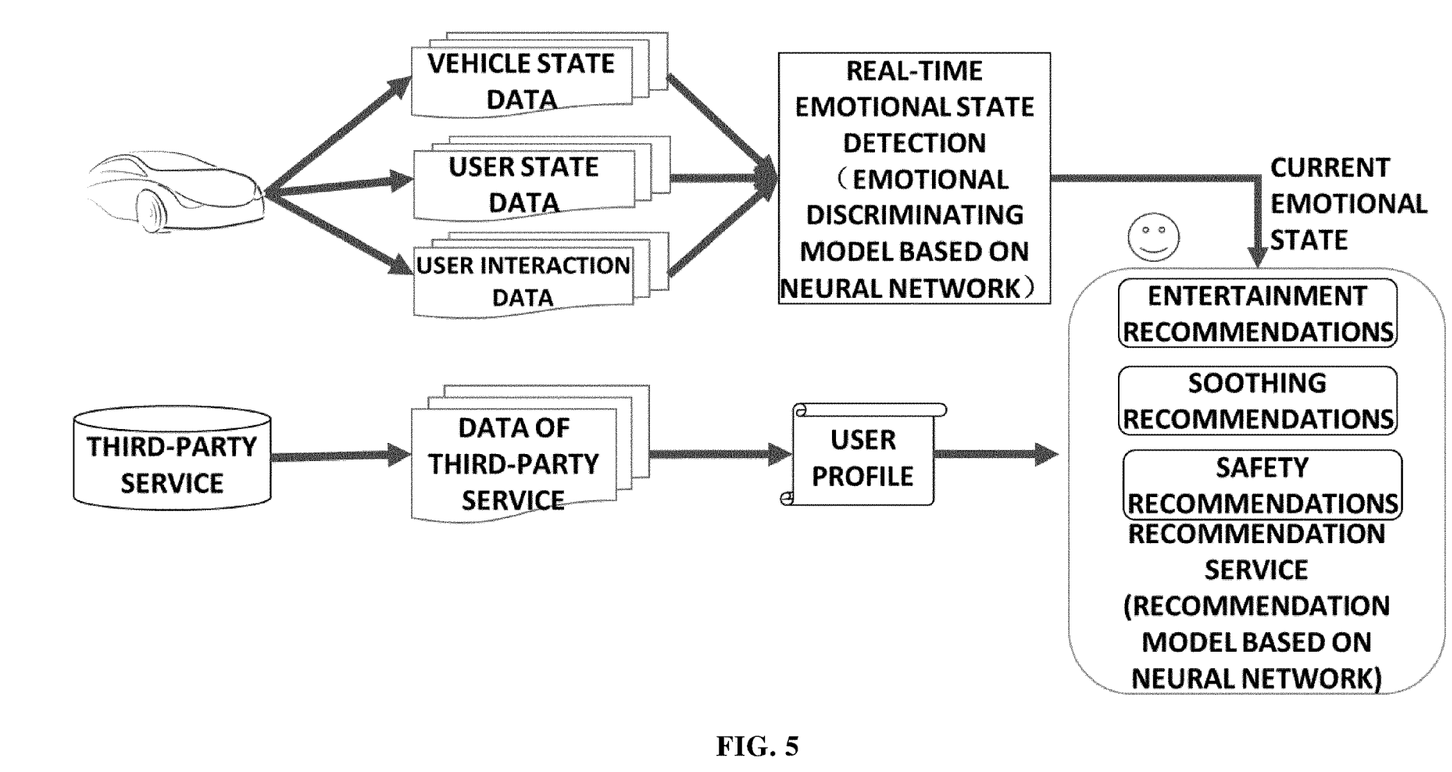
FIG. 5 shows an exemplary data flow view of a method for providing a recommendation service to a user within a vehicle according to the present disclosure.

FIG. 5 shows an exemplary data flow view of a method 100 for providing a recommendation service to a user within a vehicle according to the present disclosure. During the operation process of the vehicle, vehicle state data, user state data, and user interaction data are continuously generated. These data may be input into the emotional discriminating model according to the present disclosure so as to detect the current emotional state of the user in real time. In addition, a profile of the user representative of a user behavior habit may be generated from historical data when using a third-party service. The recommendation model (the primary recommendation model or optimization recommendation model) according to the present disclosure is capable of determining a recommendation service that conforms to a behavior habit of the user and is suitable for a current emotional state thereof based on the current emotional state of the user in conjunction with a profile of the user. In this way, a recommendation service that meets the individual needs and real-time states of the user is provided to the user during the process of driving the vehicle. Such recommendation service can effectively ensure the traffic safety when the user drives the vehicle and can be adapted to the individual needs of the user. At the same time, since the user profile and/or data generated by data derived from the third-party service are/is used in generating the recommendation service, it is also possible to expand the type and the content of the recommendation service, thereby serving the user more widely in the vehicle.

As an example, the recommendation service according to the present disclosure may include at least one of entertainment recommendations, soothing recommendations, and safety recommendations. Here, the entertainment recommendations include: route planning, provision of location-based service, schedule planning and/or display of recommended content and the like; the soothing recommendations include: route planning, provision of location-based service, audio playback, video playback, ambient light setting, seat adjustment, window and/or seat adjustment and the like; the safety recommendations include: speech prompt, vehicle speed limit, throttle limit, whistle limit, and/or speaker volume limit and the like. Here, it is preferable that, the recommendation service is output through a speaker, a display, an air conditioner, a power unit, an ambient light, a vehicle window, and/or a seat adjustment device.

Figure 6:
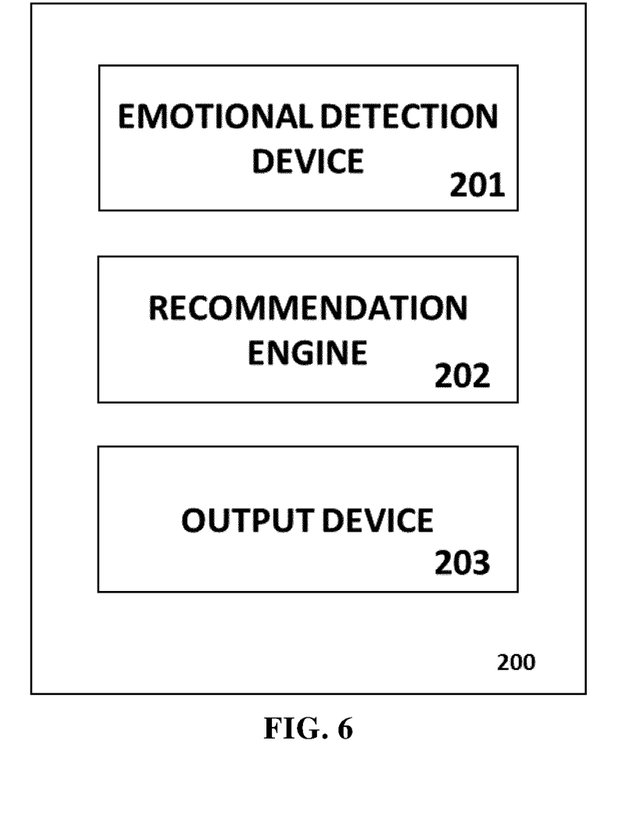
FIG. 6 shows a block diagram of a system for providing a recommendation service to a user within a vehicle according to the present disclosure.

FIG. 6 shows a system 200 for providing a recommendation service to a user within a vehicle according to the present disclosure. The system 200 comprises:

an emotional detection device 201 configured to detect a current emotional state of the user in the vehicle in real time;

a recommendation engine 202 configured to determine a recommendation service that conforms to a behavior habit of the user and is suitable for a current emotional state thereof based on the current emotional state of the user in conjunction with a profile of the user, wherein the profile of the user is generated by analyzing historical data of the user when using a third-party service; and an output device 203 configured to output the recommendation service on the vehicle.

Figure 7:
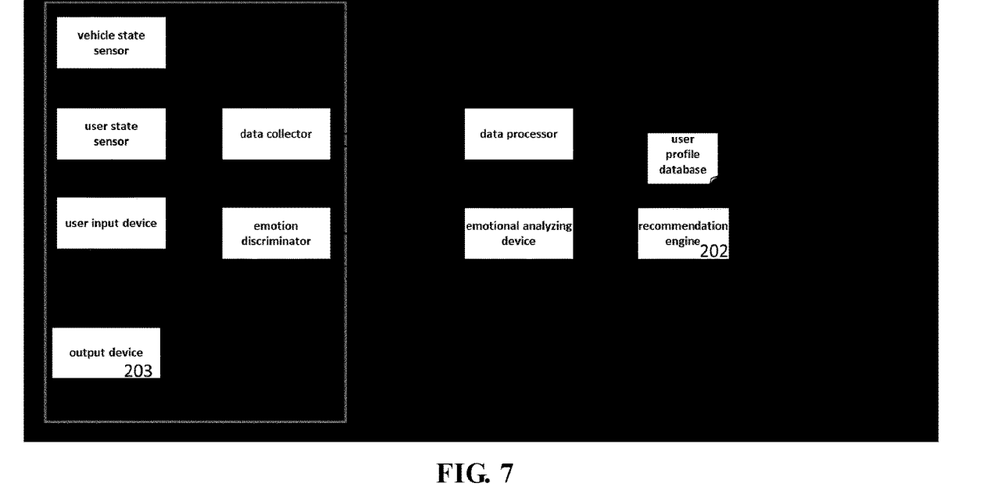
FIG. 7 shows an exemplary layout of a system for providing a recommendation service to a user within a vehicle according to the present disclosure in a vehicle and a back end.

FIG. 7 shows an exemplary layout of a system 200 for providing a recommendation service to a user within a vehicle according to the present disclosure in the vehicle and the back end. Here, the system 200 according to the present disclosure is partially distributed in the vehicle as a distributed system and partially distributed in the back end. Here, the emotional detection device 201 at least includes a vehicle state sensor, a user state sensor, a user input device, and an emotion discriminator constructed with an emotional discriminating model. The emotional discriminating model is trained in an emotional analyzing device located in a back end based on vehicle state data, user state data and user interaction data available, as well as their artificially identified emotional classification. As a result, the emotional discriminating model is advantageously trained by a more powerful computing capability of the back-end, and the parameters of the trained emotional discriminating model may be sent to the emotion discriminator arranged in the vehicle. For the emotional discriminating model, reference may also be made to the above description herein, and it will not be described in detail here. As shown in FIG. 7, the emotional detection device 201 may further include a data collector for collecting and sending data and a data processor for receiving and filtering data. The recommendation engine 202 exemplarily determines a recommendation service that conforms to a behavior habit of the user and is suitable for a current emotional state thereof based on a current emotional state of the user detected by the emotion discriminator in the vehicle in combination with a profile of the user in the user profile database.

As an example, the vehicle state sensor may include: a radar, a speedometer, an accelerometer, a gyroscope, a gear position sensor, a positioning sensor, an engine rotation speed sensor, a throttle sensor, a brake sensor, a steering wheel sensor, an air conditioner sensor, and a window state sensor and the like; the user state sensor may include: an in-vehicle camera, an electromagnetic wave signal receiver, a pressure sensor provided in a steering wheel and/or a dashboard, a pulse sensor, a respiration sensor, a body temperature sensor, and a blood pressure sensor and the like; and the user input device may include: a button, a touch screen, a microphone, and an in-vehicle camera and the like. The output device may include: a speaker, a display, an air conditioner, a power unit, an ambient light, and a seat adjustment device and the like. The recommendation engine may be further integrated with an interface docked with a third-party service.

Figure 8:
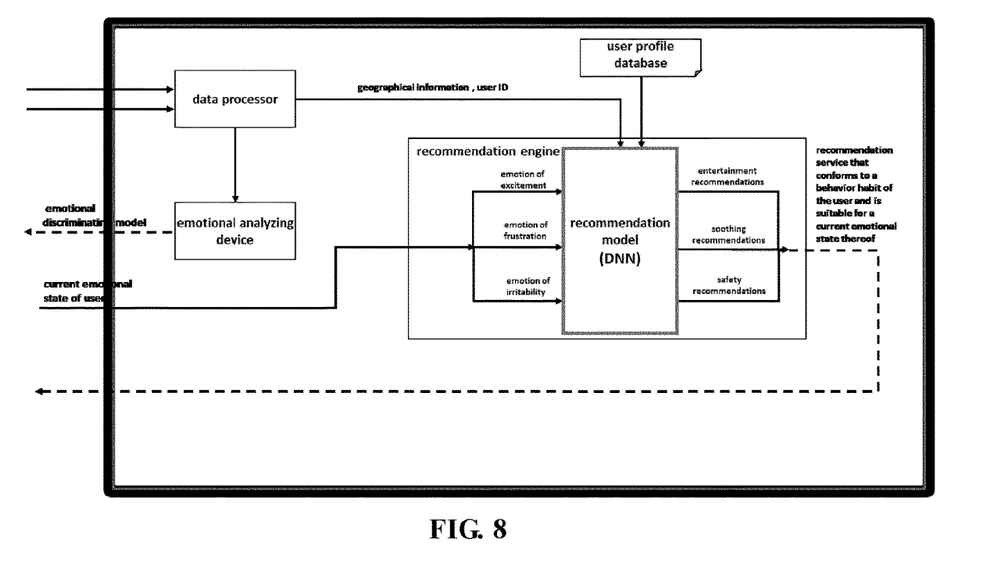
FIG. 8 shows a partial schematic view of the system for providing a recommendation service to a user within a vehicle in the back end according to the present disclosure.

FIG. 8 shows a partial schematic view of the system 200 for providing a recommendation service to a user within a vehicle in the back end according to the present disclosure. Here, the recommendation engine 200 is constructed with a recommendation model based on a neural network, particularly a deep neural network (DNN), wherein the recommendation model is trained based on product/service information, geographical information and emotional information obtained from the historical data. For the specific details of the recommendation model, reference may be made to the above description herein, and it will not be described in detail here.

In FIG. 8, the input and output of the recommendation engine 202, particularly the recommendation model therein, are shown in a simplified manner. Here, the current emotional state of the user (for example an emotion of excitement, an emotion of frustration and an emotion of irritability) detected by the emotion discriminator in the vehicle is input to the recommendation engine 202; and a profile of the user corresponding to the user ID within the user profile database is called. Here, for the sake of route navigation or a location-based service that might be included in the recommendation service, geographic information is also input to the recommendation engine 202. In this way, the trained recommendation model in the recommendation engine 202 may determine a recommendation service that conforms to a behavior habit of the user and is suitable for a current emotional state thereof. This recommendation service is returned to the vehicle and output in the vehicle. The recommendation service may include: entertainment recommendations, soothing recommendations, and/or safety recommendations, wherein the entertainment recommendations include: route planning, provision of location-based service, schedule planning and/or display of recommended content; the soothing recommendations include: route planning, provision of location-based service, audio playback, video playback, ambient light setting, seat adjustment, window and/or seat adjustment; the safety recommendations include: speech prompt, vehicle speed limit, throttle limit, whistle limit, and/or speaker volume limit. As described above, the recommendation service is specifically output through an output device such as a speaker, a display, an air conditioner, a power unit, an ambient light, and a seat adjustment device.

The present disclosure may also be a computer program product. The computer program product may include a non-transitory computer-readable storage medium having computer-readable program instructions thereon for causing a processor to perform various aspects of the present disclosure.

The non-transitory computer-readable storage medium may be a tangible device that may save and store instructions for use by an instruction execution device. The non-transitory computer-readable storage medium may be, for example, but not limited to, an electronic storage device, a magnetic storage device, an optical storage device, an electromagnetic storage device, a semiconductor storage device, or any suitable combination of the above-described devices.

The computer-readable program instructions may be executed entirely on a vehicle of the user, executed partly on a computing unit of a vehicle of the user, executed as an independent software package, executed partly on a computing unit a vehicle of the user and executed partly on a back end or executed entirely on the backend or server. In some embodiments, an electronic circuit system including, for example, a programmable logic circuit system, a field programmable gate array (FPGA), or a programmable logic array (PLA) may execute computer-readable program instructions by using state information of computer readable program instructions of a personalized electronic circuit system, so as to perform various aspects of the present disclosure.

Various aspects of the present disclosure have been described herein with reference to the flowchart and/or block diagram of the method, system, and computer program product according to the embodiments of the present disclosure. It should be understood that, each block in the flowchart and/or block diagram and a combination of blocks in the flowchart and/or block diagram may be implemented by computer-readable program instructions.

The present disclosure is not limited to the embodiments shown, but includes or encompasses all technical equivalents that may fall within the effective scope of the appended claims. The positional descriptions selected in the specification, for example, up, down, left, right, and the like, refer to direct descriptions and the illustrated accompanying drawings and can be transferred for use in new positions according to the meanings when the positions change.

The features disclosed in the present application which may be implemented individually and in any combined manner, are important for implementing aspects of different design solutions and may be realized.

Although some aspects are depicted in association with the device, it should be understood that: these aspects also pertain to descriptions of a corresponding method, such that a component of a module or a device or apparatus of a system may also be understood as one step of the corresponding method or one feature of the step of the method. Similar to this, aspects depicted in association with one step of the method or as one step of the method also pertain to descriptions of corresponding modules, details or features of the corresponding device.

Thus, the non-transitory computer readable storage medium may be machine readable or computer readable. Accordingly, in some embodiments, the non-transitory computer readable storage medium includes a data carrier having executable instructions that are capable of such cooperative function with a programmable computer system or a programmable hardware assembly, such as to implement one of the methods described here. Thus, one embodiment is a data carrier, a digital storage medium or a computer readable storage medium, on which there is recorded a program for implementing one of the methods described herein.

Moreover, another embodiment is a data stream, a signal order, or a signal sequence, which is a program for implementing one of the methods described herein. The data stream, signal order or signal sequence may, for example, be configured for transmission via a data communication connection, for example via Internet or other networks. Thus, the embodiment may also be a signal sequence representing data, which is adapted to be sent via a network or data communication connection, wherein the data is a program.

Although the present disclosure has been disclosed in preferred embodiments as above, they are not intended to limit the present disclosure. Any person skilled in the art may make possible changes and modifications to the technical solution of the present disclosure using the above-described method and technical content as disclosed without departing from the spirit and scope of the present disclosure. Therefore, for the content not departing from the technical solution of the present disclosure, any simple modifications, equivalent changes and decorations to the above embodiments according to the technical essence of the present disclosure fall within the protection scope of the technical solution of the present disclosure.

What is claimed is:

1. A method for providing a recommendation service to a user within a vehicle, the method comprising:
    detecting a current emotional state of the user in the vehicle in real time;
    determining a recommendation service that conforms to a behavior habit of the user based on the current emotional state of the user in conjunction with a profile of the user, wherein the profile of the user is generated by analyzing historical data of the user when using a third-party service; and
    outputting the recommendation service on the vehicle, including controlling at least one of an air conditioner, an ambient light and a seat adjustment device to change an in-vehicle environment of the vehicle based on the current emotional state;
    wherein when the current emotional state of the user is ease the recommendation service includes movie information, when the current emotional state of the user is excitement the recommendation service includes alcohol products, and when the current emotional state is frustration the recommendation service includes a song.

2. The method according to claim 1, wherein the recommendation service is determined by a recommendation model based on a neural network, wherein the recommendation model is trained based on product information, service information, geographical information and emotional information obtained from the historical data.

3. The method according to claim 2, wherein the geographic information is determined based on geographic information of the user and geographic information of a product or service, or the emotional information is determined based on a user interaction record.

4. The method according to claim 2, wherein the recommendation model is modified based on a data set derived from the vehicle or the profile of the user via a layer transfer.

5. The method according to claim 4, wherein parameters of layers in a primitive neural network are retained in the layer transfer, and re-trained based on the data set derived from the vehicle, and the data set derived from the vehicle at least includes behavior data and feedback data of the user on the vehicle; or
    a loss function is established using the profile of the user, so as to reversely configure the parameters in the primitive neural network.

6. The method according to claim 1, wherein the current emotional state of the user in the vehicle is detected in real time based on current vehicle state data, user state data, and user interaction data according to an emotional discriminating model.

7. The method according to claim 6, wherein the emotional discriminating model is trained based on vehicle state data, the user state data, the user interaction data, and an identified emotional classification of the vehicle state data, the user data and the user interaction data.

8. The method according to claim 7, wherein the vehicle state data includes: radar ranging data, speed data, acceleration data, gyroscope data, gear position data, geographic information data, engine rotation speed data, throttle depth or speed data, braking depth or speed data, steering wheel angular speed data, air conditioner data, and window state data; or
    the user state data includes: an in-vehicle camera data, electromagnetic wave reflection data, steering wheel or dashboard pressure sensitive data, pulse data, respiration data, body temperature data, and blood pressure data; or
    the user interaction data includes: user touch input data, speech data, and gesture data.

9. The method according to claim 1, wherein the recommendation service includes: entertainment recommendations, soothing recommendations, or safety recommendations, wherein the entertainment recommendations include: route planning, provision of location-based service, schedule planning or display of recommended content; the soothing recommendations include: route planning, provision of location-based service, audio playback, video playback, ambient light setting, seat adjustment, window or seat adjustment; and the safety recommendations include: speech prompt, vehicle speed limit, throttle limit, whistle limit, or speaker volume limit.

10. The method according to claim 1, wherein the recommendation service is output through a speaker, a display, an air conditioner, a power unit, an ambient light, a vehicle window, or a seat adjustment device.

11. A non-transitory computer-readable storage medium having executable instructions, wherein when the instructions are executed, the instructions cause a computer to implement a method comprising:
    detecting a current emotional state of the user in the vehicle in real time;
    determining a recommendation service that conforms to a behavior habit of the user based on the current emotional state of the user in conjunction with a profile of the user, wherein the profile of the user is generated by analyzing historical data of the user when using a third-party service; and
    outputting the recommendation service on the vehicle, including controlling at least one of an air conditioner, an ambient light and a seat adjustment device to change an in-vehicle environment of the vehicle based on the current emotional state;
    wherein when the current emotional state of the user is ease the recommendation service includes movie information, when the current emotional state of the user is excitement the recommendation service includes alcohol products, and when the current emotional state is frustration the recommendation service includes a song.

12. A system for providing a recommendation service to a user within a vehicle, the system comprising:
    an emotional detection device configured to detect a current emotional state of the user in the vehicle in real time;
    a recommendation engine configured to determine a recommendation service that conforms to a behavior habit of the user and is suitable for a current emotional state thereof based on the current emotional state of the user in conjunction with a profile of the user, wherein the profile of the user is generated by analyzing historical data of the user when using a third-party service; and an output device configured to output the recommendation service on the vehicle, including controlling at least one of an air conditioner, an ambient light and a seat adjustment device to change an in-vehicle environment of the vehicle based on the current emotional state;

wherein when the current emotional state of the user is ease the recommendation service includes movie information, when the current emotional state of the user is excitement the recommendation service includes alcohol products, and when the current emotional state is frustration the recommendation service includes a song.

13. The system according to claim 12, wherein the recommendation engine is constructed with a recommendation model based on a neural network, wherein the recommendation model is trained based on product or service information, geographical information and emotional information obtained from the historical data.

14. The system according to claim 12, wherein the emotional detection device includes a vehicle state sensor, a user state sensor, a user input device, and an emotion discriminator constructed with an emotional discriminating model.

15. The system according to claim 14, wherein the emotional discriminating model is trained in an emotional analyzing device in a back end based on vehicle state data, user state data, user interaction data, and an identified emotional classification of the vehicle state data, the user state data, and the user interaction data.

16. The system according to claim 14, wherein the vehicle state sensor includes: a radar, a speedometer, an accelerometer, a gyroscope, a gear position sensor, a positioning sensor, an engine rotation speed sensor, a throttle sensor, a brake sensor, a steering wheel sensor, an air conditioner sensor, and a window state sensor;

the user state sensor includes: an in-vehicle camera, an electromagnetic wave signal receiver, a pressure sensor provided in a steering wheel or a dashboard, a pulse sensor, a respiration sensor, a body temperature sensor, and a blood pressure sensor; and the user input device includes: a button, a touch screen, a microphone, and an in-vehicle camera.

17. The system according to claim 12, wherein the output device includes: a speaker, a display, an air conditioner, a power unit, an ambient light, and a seat adjustment device.

18. The system according to claim 12, wherein the recommendation engine is arranged in a back end and integrated with an interface docked with a third-party service.

* * * * *